Nov. 30, 1926.
E. J. RETZBACH
ART OF PACKAGING ICE CREAM
Original Filed June 11, 1917 2 Sheets-Sheet 1
1,609,199
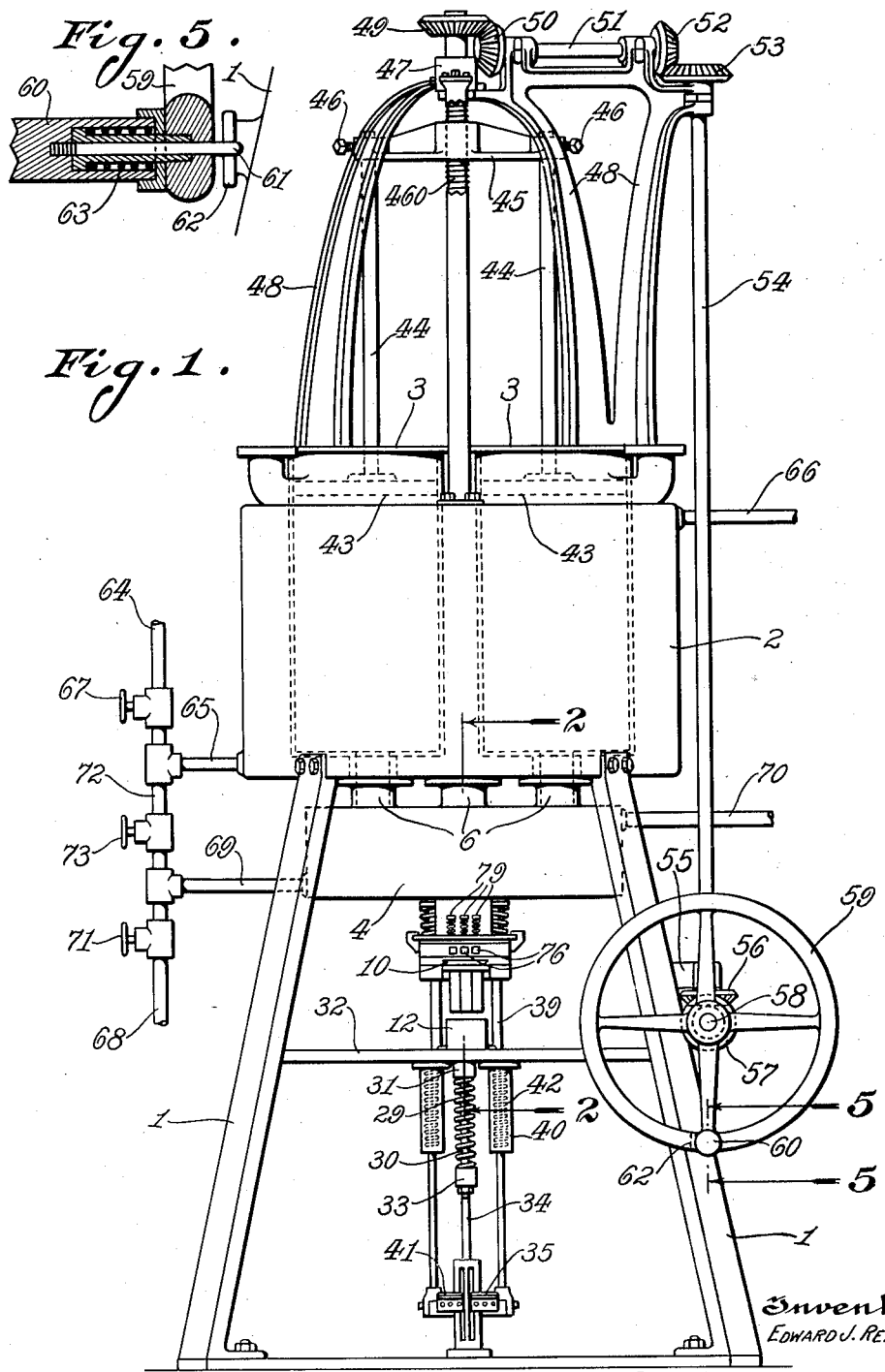

Nov. 30, 1926.  1,609,199
E. J. RETZBACH
ART OF PACKAGING ICE CREAM
Original Filed June 11, 1917   2 Sheets-Sheet 2
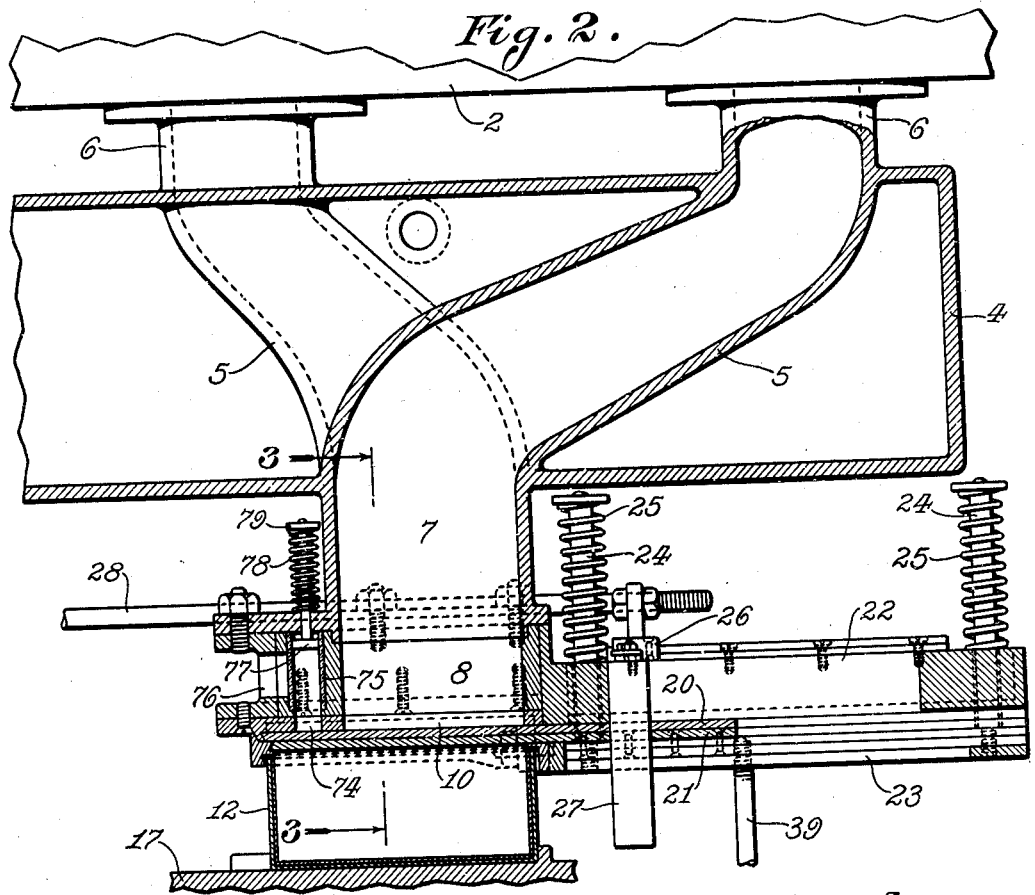
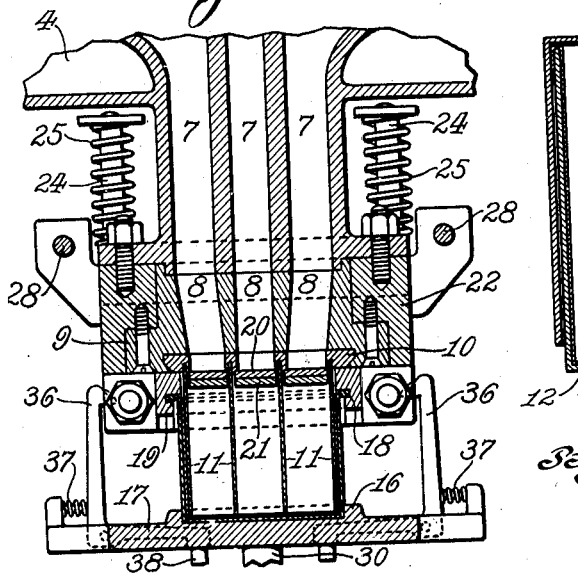
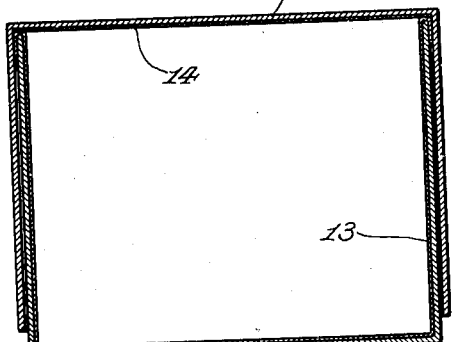
Inventor:
EDWARD J. RETZBACH,
By John H. Bruninga,
His Attorney.

Patented Nov. 30, 1926.

1,609,199

UNITED STATES PATENT OFFICE.

EDWARD J. RETZBACH, OF ST. LOUIS, MISSOURI, ASSIGNOR, BY MESNE ASSIGNMENTS, OF ONE-THIRD TO JOHN H. BRUNINGA, OF ST. LOUIS, MISSOURI.

ART OF PACKAGING ICE CREAM.

Original application filed June 11, 1917, Serial No. 174,002. Divided and this application filed August 10, 1921. Serial No. 491,113.

This invention relates to the art of making and packaging ice cream. This application is a division of application Serial Number 174,002, filed June 11, 1917, now Patent No. 1,453,407, granted May 1, 1923, which was copending with application Serial Number 721,332, filed September 19, 1912, which has matured into Patent No. 1,288,442, granted December 17, 1918.

In the manufacture of ice cream in the form of bricks as heretofore practiced, a large flat receptacle or mold was filled with ice cream in a semi-frozen or plastic state; the receptacle or mold was then placed in a refrigerating room and allowed to harden, cut into bricks of the desired size and shape, and these bricks were wrapped and placed in paper boxes for ultimate consumption and again placed in cold storage.

In the manufacture of multi-layer bricks, they are made in layers, some of the layers being of different flavors, such as vanilla, strawberry and chocolate, etc.; sometimes one or more layers of water ices, such as pineapple, lemon, orange, etc. are used. In the manufacture of multi-layer bricks, the layers were spread in successive superimposed layers of the semi-frozen product in a flat pan or mold and chilled to harden; the pan or mold is then dipped into a hot water tank, which loosens the slab to permit it to be dropped on a table, and this slab is cut up, wrapped and boxed as before described; in practice the pan or mold is placed in the hardening room after each spread or mold of a layer.

In the prior practice the operations were performed by hand which was not only slow and laborious, but subjected the product to exposure.

The operations were performed in the open air of a room, which of necessity had to be at a temperature considerably above freezing for the comfort of the workmen, and in summer the room temperature was necessarily high. Now ice cream (which term will be applied to frozen products of this nature, whether in the form of cream or milk products or water ices) is a mixture in which air is beaten into and incorporated with the liquid to form a fluffy and spongy mass. The result of the exposure of this mass, especially when in semi-frozen form, causes the surfaces thereof to become molten and slushy and lose its fluffy and spongy character. If it is attempted to overcome this by subsequent chilling in the filled box, the molten and slushy surface becomes icy and loses its fluffy and porous character; in fact, the surface becomes glazed which impairs not only its appearance and texture, but also its taste, especially since the molten portion is subject to rapid deterioration.

The handling of the uncovered slab or brick is, of course, unsanitary, especially during hot weather where it is not only subject to contact with perspiration and dust but also with insects which are naturally attracted by the product.

Some of the objects of this invention, therefore, are to develop a process or method in which the operations are not only performed with a minimum of labor and expense, but with a minimum of exposure to the air, the operator and foreign matter, and in such a manner that the original texture, velvety nature, appearance and flavor are retained.

Further objects will appear from the detail description taken in connection with the accompanying drawings, in which is disclosed a machine or apparatus adapted to conveniently perform the process or method; it is to be understood, however, that the machine is merely an illustration of a preferred apparatus for carrying on the process or method, as other apparatus may be used to perform the same and it may even be performed by elementary apparatus and by manual operations.

In accordance with the process or method embodying this invention, the ice cream is frozen to a plastic condition, known in the art as "semi-frozen", in which condition the product has been frozen while beaten up to incorporate the air therein as is desirable and even required, but in which the product is not so hard or stiff but that it will flow, although it may in most cases flow with difficulty depending, of course, upon the extent that the refrigeration has been carried out.

A merchantable package or container is used in the form of a box or carton of a size suitable for domestic consumption and which is formed of paper or any other suitable material; it may be noted in this connection that the word "paper" as applied to the material from which the containers or cartons are made is intended as a word of general description and not of limitation and to include paper or like materials which are commonly used for such purposes. The box is provided with a suitable lining and this box may be of the form described and shown in United States Patent No. 1,180,188, patented April 18, 1916.

The semi-frozen product is flowed into the box and more especially into the liner within the box. It is measured into the box to secure a brick of the desired fixed volume and weight, as it is desirable in the marketing of the merchantable unit that the customer be supplied with a brick of a known mass. In the marketing of ice cream, the margin of profit is small; accordingly it is desirable that the quantity of ice cream in the package be predetermined and measured, so that, for instance, every quart is a full quart—no more and no less. Another advantageous feature of this predetermining of the quantity is the fact that the carton will be completely filled so that the brick will not rattle in the box which, during shipment, might cause the air to be knocked out as well as be undesirable generally. Furthermore this measuring is of special utility where a carton or paper box is used, for such a box is not accurate as to volume and when of light material will bulge. Measurement will, however, secure the proper weight brick. In the filling of the box, the flow is preferably under pressure, so that the flow is forced and the action of gravity supplemented by a forcing or chasing action; for from the nature of the product the flow is not only tardy but the product has a tendency to stick to the metal conduits through which it passes; this is especially true where the refrigeration of the semi-frozen product has been carried out considerably, it being noted that it is desirable that even the semi-frozen product be refrigerated as much as possible. It has, however, been found that with the low pressures required to secure the desired result, there is really no detrimental effect on the product nor any appreciable loss in yield. By, however, flowing the product into the box under pressure, not only is it possible to secure a measured brick, and not only is wastage prevented, but it is possible to flow a product of heavy viscosity, and this is the condition that will produce the best ice cream—a product free from large water crystals and, therefore, smooth to the taste.

Reference to the drawing, Figures 2 and 3, shows that the top of the carton as well as the bottom thereof is sustained against lateral distortion. This is important, keeping in mind that we are necessarily dealing here with a frail box of paper which cannot be too thick, otherwise it would take too long to chill the ice cream commercially. In discharging the semi-frozen ice cream into a carton or paper box, a material must be used which is not entirely self-sustaining, especially during filling and before the cover is placed on the box and can act to sustain the upper edges. However, by sustaining the box against distortion during filling the sides will not sag so that the box can be filled comparatively full without spilling.

Where as hereinafter described a multi-layer brick is formed, the different flavors in a semi-frozen condition are flowed into the box to form layers. These flavors are preferably flowed concurrently to form a complete brick at one operation, and in order to accomplish this, they are introduced vertically and side by side to form vertical portions arranged side by side. The concurrent introduction of the flavors enables divisions to be established between the layers so that while one layer will merge into the other, they will not mix. In the formation of a multi-layer brick, the flow is also preferably accomplished under pressure. This is especially advantageous where a multi-layer brick is produced, for the reason that the flavors are often of different prices and since the margin of profit is figured rather close, the highest priced flavor should be kept down to a predetermined volume. Furthermore gravity can not be depended on, where several flavors of the desired viscosity must be flowed into a carton to produce a multi-flavor brick. The use of this forcing auxiliary to the gravity flow, however, secures a uniform brick and especially a uniform multi-layer brick in that the flowing of the different flavors can be controlled.

The box as filled is capped with a cover, such as in Patent No. 1,180,188, which is also lined, and the covered box is placed in a refrigerator and allowed to harden to the required extent and consistency. It will be seen that the box is not only sustained but the top is also covered so that the hardening will be uniform throughout.

In accordance with this invention the semi-frozen product is contained in a large container or tank, and in case of multi-layer bricks, in corresponding large containers or tanks, and this tank or tanks is or are suitably constructed to maintain the product in the proper semi-frozen condition, which in the illustrative apparatus hereinafter described, is accomplished by jacketing the container or containers. There is thus provided a large body or bodies of the semi-frozen product, from which the product is flowed directly into the package, and this body or bodies is or are large compared to the size of the package. Accordingly the provision of such a large body or bodies will not only secure uniformity of the product, in consistency and composition, but it assures that the product will have the proper viscosity, and moreover eliminates melting, or deterioration of the product before as well as after it enters the package.

There is thus produced as a result a merchantable unit in which the box and the lining therein protects the brick formed of the product, which has been flowed into the box and the lining therein in a semi-frozen condition and chilled to a hardened condition therein. In a multi-layer brick the layers of different flavors are arranged side by side, and while they merge into one another, they are not mixed but clear divisions between them are established. On account of the fact that the semi-frozen product is introduced directly into the box, the hand of the operator does not touch it at all nor is the product subjected to exposure at all; moreover the heating of the hardened product in order to loosen it from the mold, by dipping it in hot water, as was necessary in the prior method, is entirely eliminated. The process, therefore, not only secures the required sanitation but the exposure of the product to heat is really a minimum, so that the surface will not become molten or slushy and will, therefore, retain its original texture; this is especially true where, the semi-frozen product is introduced directly into the lining as this lining acts to retain the texture and fluffy and velvety condition of the product on its surface. Furthermore in view of the fact that the ice cream is flowed into and hardened in a standard ice cream box or carton, as distinguished from a mold or receptacle of metal, a slow and uniform freezing takes place so that the ice cream will be hardened uniformly throughout and not merely on the outside surfaces of the inclosed brick. This is of particular advantage where the package is of small volume as is the case of pint and quart bricks which are designed for delivery to and consumption by the ultimate consumer. Accordingly the formation of "icy bricks" is avoided and the ice cream as delivered to the ultimate consumer is in the desired fluffy condition.

In accordance with the prior method, the layer of softened ice cream next to the mold surfaces, usually hardened into a coarse, icy or grainy crust, causing the defect commonly known as icy bricks. This was caused by the fact that no air could be incorporated into the water drops while the bricks were being rehardened. In accordance with this invention, however, this difficulty is entirely eliminated; the water crystals are all of uniform size throughout the brick; the product is most pleasing to the taste; and the texture and smoothness of the product is unexcelled when the ice cream is flowed directly into the carton.

In accordance with this invention the operations are materially reduced, for the following operations are entirely eliminated in the manufacture of single flavor bricks: 1, pouring of the ice cream into the molds; 2, transferring of the molds to the hardening room; 3, removing of the molds from the hardening room to the cutting room; 4, dipping the molds in hot water; 5, removing the slabs from the molds; 6, cutting the slabs into bricks; 7, wrapping the bricks in liners; 8, inserting the hardened bricks into the cartons; 9, placing the filled cartons in storage. In the manufacture of multi-layer bricks steps 1, 2 and 3 are doubled or trebled according to whether two or three layer bricks are made. In accordance with this invention, however, the steps are simply the flowing of the product into the package and the hardening of the product in the package. The result is, therefore, not only a great saving in labor, but also of floor space, cooler space and cost of refrigeration.

In accordance with this invention the ice cream is packaged in merchantable units or bricks for delivery to the ultimate consumers, by flowing the product in a semi-frozen or plastic condition, directly into a package of a size suitable for domestic consumption, and by chilling the product while in the package to a hardened condition. The process is, therefore, one of packaging in merchantable units and the result is a merchantable unit adapted for domestic consumption, as distinguished from shipping the product to the dealer in cans, from which the product is taken and sold in portions; the latter is bulk ice cream while this invention relates to package ice cream; the conditions encountered in the bulk process, where we are dealing with large volumes in metal cans, and in this packing process, where we are dealing with small volumes, such as pints and quarts, in cartons or paper boxes, are entirely different.

In the accompanying drawings, which illustrate an apparatus adapted for performing the process or method embodying this invention—

Figure 1 is an elevation of the machine;
Figure 2 is a section on line 2—2, Figure 1;
Figure 3 is a section on line 3—3, Figure 2;
Figure 4 is a vertical section of the box; and
Figure 5 is a detail section on line 5—5, Figure 1.

In referring to the accompanying drawings, only a brief and general description will be given of the apparatus since the same is fully described in application Serial Number 174,002, to which reference may be had for details.

Referring now to the accompanying drawings, a frame work comprising a series of standards 1 supports a cylindrical structure 2 which is cored to provide a jacket for a series of cylinders 3 arranged therein, and which cylinders may be of any suitable non-corrosive material, such as aluminum, and may in number correspond to the number of flavors which it is desired to introduce into the box; in this particular embodiment the number of flavors is three and there are accordingly three cylinders. Arranged below the cylindrical structure 2 is a second cylindrical structure 4 which is also cored to provide a jacket for a series of conduits 5 which pass therethrough and which are connected with the cylinders 3 by necks 6. There are in this case also three of these conduits 5 which lead from the cylinders and terminate in oblong passages 7 arranged side by side. The passages 7 connect with corresponding passages 8 or ports in a block 9 which merge into corresponding passages in a block 10 to which blocks are attached a series of blades 11 which provide a form.

The box 12 has a liner 13 for the bottom and sides and a liner 14 for the cover 15, which box and its liner may be of the construction as fully shown and described in Patent No. 1,180,188, previously referred to.

The box is supported by guides 16 on a vertically movable table 17 so that the box may take over the form 11, the upper edges of the box taking against a gasket 18 on a block 19 located underneath the blocks 9 and 10. Accordingly the semi-frozen product in the cylinders 3 is arranged to pass downwardly and into the form within the box so as to provide a series of vertically standing layers arranged side by side within the form and within the box.

A pair of cut-off slides or valves 20 and 21 are mounted for sliding movement between the blades, these slides being slotted to take over the blades. The upper slide is mounted in a guide in a support 22 secured to the structure 4 and vertically stationary, while the slide 21 is mounted in a guide in a movable carrier 23 arranged for vertical movement on the support 22, guided by stems 24 attached to the carrier 23 and to the support 22, springs 25 being provided for normally retaining the carrier in raised position. A cross head 26 guided for movement on the support 22 has a shank 27 passing through the slides and this cross head has manipulative means 28 arranged for operation at the front of the machine, so that by moving the same back and forth the slides may be moved to open and closed position to open or close the passages 7 and 8 and the ports 10. On account of the extension of the shank 27, however, the lower slide 21 is arranged for vertical movement with the box as hereafter described.

The table 17 is mounted for vertical movement, being normally held depressed by one or more springs 29 on shanks 30 which support the table and between a guide 31 on a cross-piece 32 connecting the legs 1 and a cross-head 33. This cross head is connected by a link 34 with a treadle 35, which when raised elevates the table. The table 17 has mounted thereon a pair of latches 36 adapted to take into notches in the block 19 (which is secured to the carrier 23) and which latches are acted upon by springs 37. The latches are in the form of bell crank levers, the horizontal arms of which have legs 38 adapted to engage the cross-piece 32 to trip the latches. When the table is raised by depression of the treadle 35 to place the box over the form 11, the latches 36 will engage the block 19 and hold the table and the box raised with the spring 29 under tension, it being noted that the combined strength of the springs 25 is sufficient for this purpose.

The carrier 23 has shanks 39 passing through guides 40 connected with a treadle 41, and arranged within the guides 40 are springs 42 which bear against collars on the shanks 39 and assist the springs 25 in holding the carrier 23 raised even against the tension of the spring 29. When it is desired to lower the table 17, the treadle 41 is depressed, which causes the carrier 23 and the block 19 attached thereto to move downwardly carrying the box as well as the slide 21 with it. As soon, however, as the table 17 reaches its lower limit, the legs 31 by engaging the cross-piece 32 will disengage the latches 36. Accordingly upon release of the treadle 41, the carrier 23 and its attached block 19 will be restored to normal position leaving the table 17 and the box thereon depressed.

Each cylinder has arranged therein a piston 43, the rods 44 of which are secured in a cross-head 45 by means of set screws 46, permitting the pistons to be adjusted relatively to the cross head. This cross head is internally threaded and rests on a screw 460 seating at its lower end in the structure 2 and running at its upper end in a bearing 47 in brackets 48, on the structure 2. The screw 460 has a bevel gear 49 meshing with a pinion 50 on a shaft 51 in one of the brackets 48 and this shaft has a pinion 52 meshing with a bevel gear 53 on a vertical shaft 54 mounted in suitable bearings in the bracket 48 and in a bracket 55 on one of the legs 1. The lower end of the shaft 54 has a pinion 56 which meshes with a bevel gear 57 on a shaft 58 also mounted in the bracket 55 and having a hand wheel 59.

The hand wheel 59 has a handle 60, which has attached thereto a plunger 61 arranged to project through the hand wheel and adapted to cooperate with the stop 62 on the leg 1. This plunger 61 is normally extended, being retained in extended position and in the path of the stop 62 by a spring 63, which is arranged to be retracted against the tension of the spring by pulling on the handle so as to move this plunger out of the path of the stop 62.

The jacket in the structure 2 is arranged to be supplied with brine from any suitable source 64, the brine being delivered to the lower part of the jacket by a pipe 65 and issuing by a pipe 66 at the upper end, a suitable valve 67 being provided to control the flow. Similarly the jacket of the structure 4 is adapted to receive warm water from any suitable source of supply 68 connected by a pipe 69 at the lower end of the jacket, an outlet 70 being provided at the upper end and a valve 71 is provided to control the flow. There is also a connection 72 between the brine and the warm water system controlled by a valve 73. It will, therefore, be seen that by proper manipulation of the valves, warm water or brine may be admitted to either of the jackets; accordingly the temperatures of the jackets may be accurately controlled.

Each passage 8 and port 10 has arranged in front thereof and in alinement therewith a passage 74, which is arranged to connect with its compartment in the form. Each passage extends vertically to provide a chamber and this chamber is formed by a glass tube 75 visible through a sight opening 76 from the front of the machine. Arranged in each tube is a piston 77, which is held in raised position by a spring 78 on the plunger rod and which bears against the head 79 thereon, whereby the plunger may be depressed.

Having thus described the mechanism a brief explanation of the operation will be given.

The ice cream in a semi-frozen condition is discharged from the freezer direct into the cylinders, these cylinders being filled to any suitable extent. By turning the hand wheel 59 the pistons 43 are lowered into the cylinders, thereby causing the product to flow along the conduits and to the form. By the adjustable connection between the piston rods 44 and the crosshead 45, the initial relative positions of the pistons can be adjusted so that their operation will be uniform, these pistons being finally clamped by the set screws 46. By means of the brine and warm water supplies the temperatures of the jackets can be adjusted to the required extent for satisfactory operation.

When the machine is ready for operation to discharge uniform quantities through the several passages, the slides 20 and 21 being now closed, a lined box is placed on the table 17 and the table is raised by depression of the treadle 35 and latched in raised position with the box over the form and against the gaskets 18. The slides are now retracted by moving rearwardly on the manipulative means 28 so as to open the form to the conduits. Upon now turning the hand wheel the semi-frozen product will be forced along the conduits and into the form so as to fill the form within the box. After the form has been filled the slides are again moved forwardly, thereby cutting off communication between the conduits and the form. The treadle 41 is now depressed which moves the box downwardly off of the form. During this movement the lower slide 21 will move with the box thereby scraping the ice cream from the form blades and into the box. The table will now be released from the carriers by disengagement of the latches 36 and the carrier and its slide can be moved back to original position, leaving the box on the depressed table.

Where it is desired to completely fill a standard box, the movement of the hand wheel can be continued until the compartments are completely filled. As soon as this filling is completed, the surplus product will rise in the tubes 75 visible through the sight opening 76 and this will, therefore, furnish an indication of a complete filling, as the operator can be assured that every compartment is filled before interrupting the flow until the product has risen in the tube. These tubes will also perform the function of compensating for irregularities in that they will take up any excess product from one or more of the compartments until every compartment is filled. Of course, when another box is placed in position, these tubes can be emptied by a simple depression of the plungers 77 by manipulation of the heads 79.

It will be noted from an inspection of Figures 2 and 3 that even when the slides are again closed, there is a small space between the face of the lower slide 21 and the top of the box. This permits the box to be filled heap full; this extra supply is provided to compensate for the thickness of the blades as well as to provide for a settling, so that the box will in every case be completely filled.

In many cases it is desired to measure into the box a predetermined quantity of the product. In accordance with this invention, therefore, the gearing between the hand wheel and the pistons is so proportioned with reference to the proportions of the cylinder, that one complete turn of the hand wheel operates to discharge a predetermined quantity of the product into the box, and in case of multi-layer bricks, a predetermined quantity of each flavor. The operation of filling a box is, therefore, started with the plunger 61 engaging the stop 62. When thereafter a box is placed in position for filling the operator will pull out on the handle 60, thereby withdrawing the plunger 61 out of the path of the stop 62, and while thus withdrawn, the hand wheel is turned until the plunger has passed the stop. Thereafter the handle is again released, again projecting the plunger. The operator can now move the hand wheel a complete turn to its limit until stopped by the engagement of the plunger with the stop. In this way a predetermined quantity of the product is actually measured into the box.

After the box has been filled with a semi-frozen product it is placed in a refrigerator and chilled in the box and within the lining therein to the desired hardness and consistency; it is then ready for delivery to the ultimate consumer. This chilling may be performed in any suitable apparatus, such as the usual hardening room used in the prior practice.

The cylinders 3 as well as the blocks 9 and 10, the blades 11, the slides 20 and 21, and the block 19 may be made of a non-corrosive material, such as aluminum, while the conduits 6 may be interiorly plated with tin or any other suitable non-corrosive material. It is, therefore, to be particularly observed that in the operation of the machine, the product is, owing to the parts with which it comes into contact being either composed of aluminum or plated with a non-corrosive material, prevented from coming into contact with anything which might injuriously affect its flavor. Owing to the material being introduced into the cylinders directly from the freezer, and finally discharged directly into the boxes for ultimate consumption, thorough sanitation in handling the product is maintained.

Futhermore in view of the fact that the product is delivered in measured quantities, or according to measurements, uniform quantities are discharged into the box. In this connection it may be mentioned that in instances where multi-layer bricks are composed of one or more layers of ice cream and a layer of water ice, the ice cream being heavier tends to force the water ice out of the form. The machine, however, provides for overcoming this difficulty, by the provision of the tubes which may receive from the form a surplus amount of material to be again delivered into the form at the beginning of molding of the next succeeding brick, it is evident that where water ice is to be combined with ice cream, this supplying of an additional amount of product to one of the layers may be further carried out by discharging a surplus material, taken up by the proportioned indicating tube, back into the form thus providing for increasing the amount of product in any one of the layers at will. It is to be noted that the present machine effectually provides not only for regulating and positively controlling the amount of product delivered to the form as a whole, but to the several compartments of the form and for visually indicating to the operator the fact that the determined amount for filling the form has been discharged thereinto.

It is obvious that various changes may be made in details without departing from the spirit of this invention; it is, therefore, to be understood that this invention is not to be limited to the specific details shown and described.

Having thus described the invention, what is claimed is:

1. In the art of making and packaging ice cream in merchantable units or bricks of small volume for delivery to the ultimate consumers, the process comprising, flowing the semi-frozen product from a source of supply and while the product is maintained in proper semi-frozen condition, directly into and so as to fill a carton or paper box of a size suitable for domestic consumption, and chilling the product in the filled carton to a hardened condition, substantially as and for the purpose set forth.

2. In the art of making and packaging ice cream in merchantable units or bricks of small volume for delivery to the ultimate consumers, the process comprising, flowing the semi-frozen product from a source of supply and while the product is maintained in proper semi-frozen condition, directly into and so as to fill a paper-lined carton or paper box of a size suitable for domestic consumption, and chilling the product in the filled carton to a hardened condition, substantially as and for the purpose set forth.

3. In the art of making and packaging ice cream in merchantable units or bricks of small volume for delivery to the ultimate consumers, the process comprising, flowing a predetermined quantity of the semi-frozen product from a source of supply and while the product is maintained in proper semi-frozen condition, directly into and so as to fill a carton or paper box of a size suitable for domestic consumption, and chilling the product in the filled carton to a hardened condition, substantially as and for the purpose set forth.

4. In the art of making and packaging ice cream in merchantable units or bricks of small volume for delivery to the ultimate consumers, the process comprising, flowing the semi-frozen product under pressure from a source of supply and while the product is maintained in proper semi-frozen condition, directly into and so as to fill a carton or paper box of a size suitable for domestic consumption, and chilling the product in the filled carton to a hardened condition, substantially as and for the purpose set forth.

5. In the art of making and packaging ice cream in merchantable units or bricks of small volume for delivery to the ultimate consumers, the process comprising, flowing the semi-frozen product from a source of supply and while the product is maintained in proper semi-frozen condition, directly into and so as to fill a carton or paper box of a size suitable for domestic consumption and while the carton is sustained against distortion, and chilling the product in the filled carton to a hardened condition, substantially as and for the purpose set forth.

6. In the art of making and packaging ice cream in merchantable units or bricks of small volume for delivery to the ultimate consumers, the process comprising, flowing the semi-frozen product from a source of supply and while the product is maintained in proper semi-frozen condition, directly into and so as to fill a carton or paper box of a size suitable for domestic consumption, placing the cover on the filled carton, and chilling the product in the filled and covered carton to a hardened condition, substantially as and for the purpose set forth.

7. The method of packaging ice cream in merchantable units or bricks of small volume for delivery to the ultimate consumer, which consists in flowing ice cream in the semi-frozen condition as drawn off from a so-called "freezer" directly into and so as to fill cartons or paper boxes of a capacity suitable for domestic consumption, placing paper covers on the packages so as to entirely surround and seal the semi-frozen ice cream in the boxes, and then placing the boxes in a refrigerating room and there freezing the semi-frozen ice cream to a hardened condition while so inclosed in the paper boxes, said boxes forming the sole supporting means for the ice cream during the said freezing thereof, substantially as described.

8. In the art of making and packaging ice cream in merchantable units or bricks of small volume for delivery to the ultimate consumers, the process of comprising, flowing a series of flavors of the semi-frozen product from a corresponding series of sources and while the product is maintained in proper semi-frozen condition, directly into a carton or paper box of a size suitable for domestic consumption, so as to assemble the flavors in and to fill the carton with the semi-frozen product, and chilling the product in the filled carton to a hardened condition, substantially as and for the purpose set forth.

9. In the art of making and packaging ice cream in merchantable units or bricks of small volume for delivery to the ultimate consumers, the process comprising, flowing a series of flavors of the semi-frozen product from a corresponding series of sources and while the product is maintained in proper semi-frozen condition, directly into a paper lined carton or paper box of a size suitable for domestic consumption, so as to assemble the flavors in and to fill the carton with the semi-frozen product, and chilling the product in the filled carton to a hardened condition, substantially as and for the purpose set forth.

10. In the art of making and packaging ice cream in merchantable units or bricks of small volume for delivery to the ultimate consumers, the process comprising, flowing a predetermined quantity of each of a series of flavors of the semi-frozen product from a corresponding series of sources and while the product is maintained in proper semi-frozen condition, directly into a carton or paper box of a size suitable for domestic consumption, so as to assemble the flavors in and to fill the carton with the semi-frozen product, and chilling the product in the filled carton to a hardened condition, substantially as and for the purpose set forth.

11. In the art of making and packaging ice cream in merchantable units or bricks of small volume for delivery to the ultimate consumers, the process comprising, flowing a series of flavors of the semi-frozen product under pressure from a corresponding series of sources and while the product is maintained in proper semi-frozen condition, directly into a carton or paper box of a size suitable for domestic consumption, so as to assemble the flavors in and to fill the carton with the semi-frozen product, and chilling the product in the filled carton to a hardened condition, substantially as and for the purpose set forth.

12. In the art of making and packaging ice cream in merchantable units or bricks of small volume for delivery to the ultimate consumers, the process comprising, flowing a series of flavors of the semi-frozen product from a corresponding series of sources and while the product is maintained in proper semi-frozen condition, directly into a carton or paper box of a size suitable for domestic consumption and while the carton is sustained against distortion, so as to assemble the flavors in and to fill the carton with the semi-frozen product, and chilling the product in the filled carton to a hardened condition, substantially as and for the purpose set forth.

13. In the art of making and packaging ice cream in merchantable units or bricks of small volume for delivery to the ultimate consumers, the process comprising, flowing a series of flavors of the semi-frozen product from a corresponding series of sources and while the product is maintained in proper semi-frozen condition, directly into a carton or paper box of a size suitable for domestic consumption, so as to assemble the flavors in and to fill the carton with the semi-frozen product, placing the cover on the filled carton, and chilling the product in the filled and covered carton to a hardened condition, substantially as and for the purpose set forth.

14. In the art of making and packaging ice cream in merchantable units and bricks of small volume for delivery to the ultimate consumers, the process comprising, filling a carton or paper box, of a size suitable for domestic consumption, with a series of vertically arranged layers of the semi-frozen product, and chilling the product while in the carton to a hardened condition, substantially as and for the purpose set forth.

15. In the art of making and packaging ice cream in merchantable units or bricks of small volume for delivery to the ultimate consumers, the process comprising, flowing into a carton or paper box of a size suitable for domestic consumption, measured quantities of the semi-frozen product to form a series of vertically arranged layers therein, and chilling the product while in the carton to a hardened condition, substantially as and for the purpose set forth.

16. In the art of making and packaging ice cream in merchantable units or bricks of small volume for delivery to the ultimate consumers, the process comprising, concurrently flowing a series of flavors of the ice cream in a semi-frozen condition, into a carton or paper box of a size suitable for domestic consumption, and chilling the product while in the carton to a hardened condition, substantially as and for the purpose set forth.

17. In the art of making and packaging ice cream in merchantable units or bricks of small volume for delivery to the ultimate consumers, the process comprising, concurrently flowing a series of flavors of the ice cream in a semi-frozen condition under pressure, into a carton or paper box of a size suitable for domestic consumption, and chilling the product while in the carton to a hardened condition, substantially as and for the purpose set forth.

18. In the art of making and packaging ice cream in merchantable units or bricks of small volume for delivery to the ultimate consumers, the process comprising, flowing a series of flavors of the semi-frozen product from a corresponding series of sources and while the product is maintained in proper semi-frozen condition, into a sustained carton or paper box of a size suitable for domestic consumption, while maintaining the flavors separated, and chilling the product in the carton to a hardened condition, substantially as and for the purpose set forth.

19. In the art of making and packaging ice cream in merchantable units or bricks of small volume for delivery to the ultimate consumers, the process comprising, flowing the semi-frozen product from a source of supply and while the product is maintained in proper semi-frozen condition, directly into a carton or paper box of a size suitable for domestic consumption, forcing such flow in order to fill the carton or box, and chilling the product in the filled carton to a hardened condition, substantially as and for the purpose set forth.

20. In the art of making and packaging ice cream in merchantable units or bricks of small volume for delivery to the ultimate consumers, the process comprising, flowing a series of flavors of the semi-frozen product from a corresponding series of sources and while the product is maintained in proper semi-frozen condition, directly into a carton or paper box of a size suitable for domestic consumption, forcing such flow so as to assemble the flavors in and to fill the carton with the semi-frozen product, and chilling the product in the filled carton to a hardened condition, substantially as and for the purpose set forth.

In testimony whereof I affix my signature this 18th day of July, 1921.

EDWARD J. RETZBACH.